Figure 1:
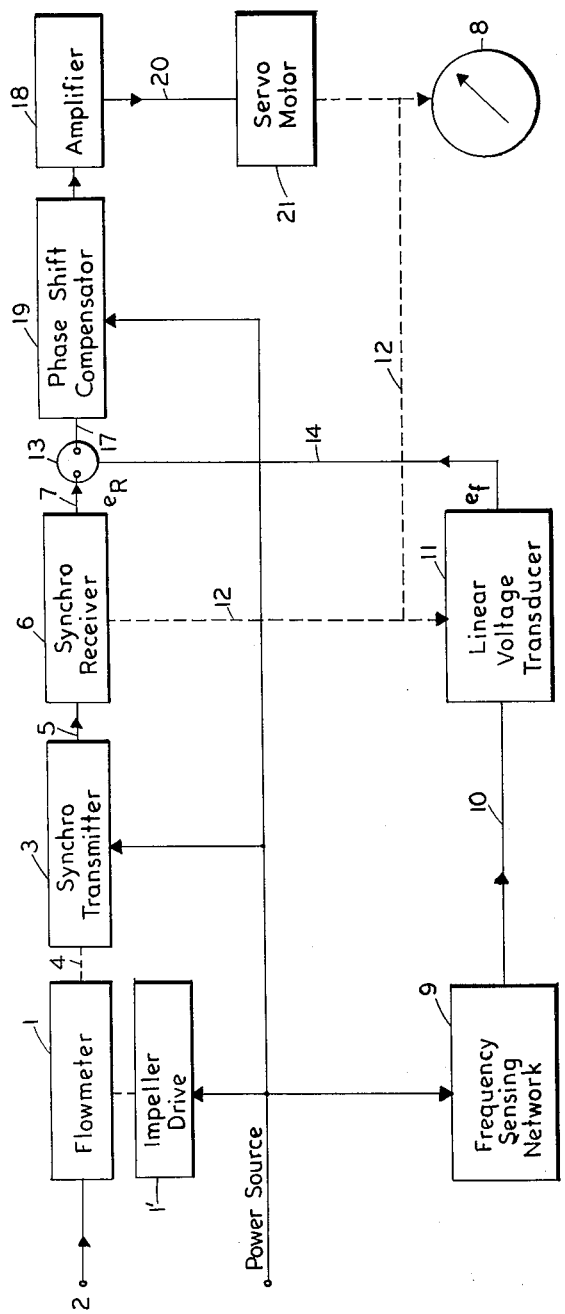

April 9, 1963 C. F. TAYLOR 3,084,544
FREQUENCY COMPENSATED MASS FLOWMETER
Filed March 4, 1959 2 Sheets-Sheet 1

INVENTOR.
Clement F. Taylor
BY
Irving M. Freedman
His Attorney

INVENTOR.
Clement F. Taylor
BY
Irving M. Freedman
His Attorney

United States Patent Office 3,084,544
Patented Apr. 9, 1963

3,084,544
FREQUENCY COMPENSATED MASS FLOWMETER
Clement F. Taylor, Lynn, Mass., assignor to General
Electric Company, a corporation of New York
Filed Mar. 4, 1959, Ser. No. 797,177
6 Claims. (Cl. 73—194)

This invention relates to the minimizing of errors in a mass flowmeter system, and in particular, to an arrangement for use with a flowmeter to compensate for errors which result from deviations of the impeller speed of rotation from the nominal value at which the system indicator has been calibrated.

Accurate measurement and control of fluid flow with reference to mass may be advantageously performed with apparatus utilizing angular momentum phenomena. In such apparatus, the measured fluid is accelerated to a uniform linear speed about a given axis by a fluid impeller rotated about that axis at a constant speed. Measurements representative of the power required for such acceleration or representative of the power lost in predetermined deceleration of the fluid after it has been so accelerated is used as an indication of mass flow characteristics. However, the electrical position signal produced by such mass flowmeters is proportional not only to the mass flow rate but to the impeller speed of rotation. In other words, the indicator scale readings will be accurate only at the impeller speed at which the scale was calibrated and deviations from such speed will result in indicator errors. It is common practice to drive the impeller of such a flowmeter from a synchronous electric motor. In such installations, the frequency of the power system may vary sufficiently to cause variations of motor speed and thus errors of mass flow indications through variations of impeller speed. Similarly, many "constant" speed impeller drive arrangements have speed variations of ±1% or more, introducing indicator errors.

It is an object of the present invention to provide an improved mass flow measurement apparatus wherein effects of impeller speed variations from a nominal speed are automatically compensated for.

Another object of the invention is to provide an improved circuit for developing the speed compensating signal.

A further object of this invention is to provide an improved mass flow measurement apparatus having a remotely located indicator electrically connected to the flowmeter transmitter through a 3 wire position synchro system and including means to develop an electrical signal to compensate for variations of impeller speed from a nominal speed.

Further objects and advantages of the invention will become apparent as the following description proceeds and the features of novelty which characterize the invention will be pointed out with particularity in the claims annexed to and forming a part of this specification.

In accordance with one form of the invention, a fluid mass rate of flow measuring device of the type having motive means driving the fluid through a flow detector is provided with a remote position telemetering arrangement to position an indicator in accordance with the angular response of the mass rate of flow sensing means. The telemetering arrangement includes a transmitter synchro the rotor of which moves in accordance with the flow sensing means and the stator of which is connected to a receiver synchro. The signal developed by the rotor of the receiver synchro is used to drive a servo motor system to position the receiver synchro rotor in accordance with the signal and the resultant position of the receiver rotor is coupled to an indicator.

A frequency compensating network develops a second electrical signal which varies in accordance with the frequency or speed deviation of the fluid motive means and the compensating signal is combined with the receiver synchro rotor signal to produce a resultant rotor and indicator position which compensates for deviations of speed of the motive means which would otherwise cause errors in the indicator readings. The network includes a transformer and a capacitor connected such as to produce a balanced output signal at the nominal speed.

Figure 2:
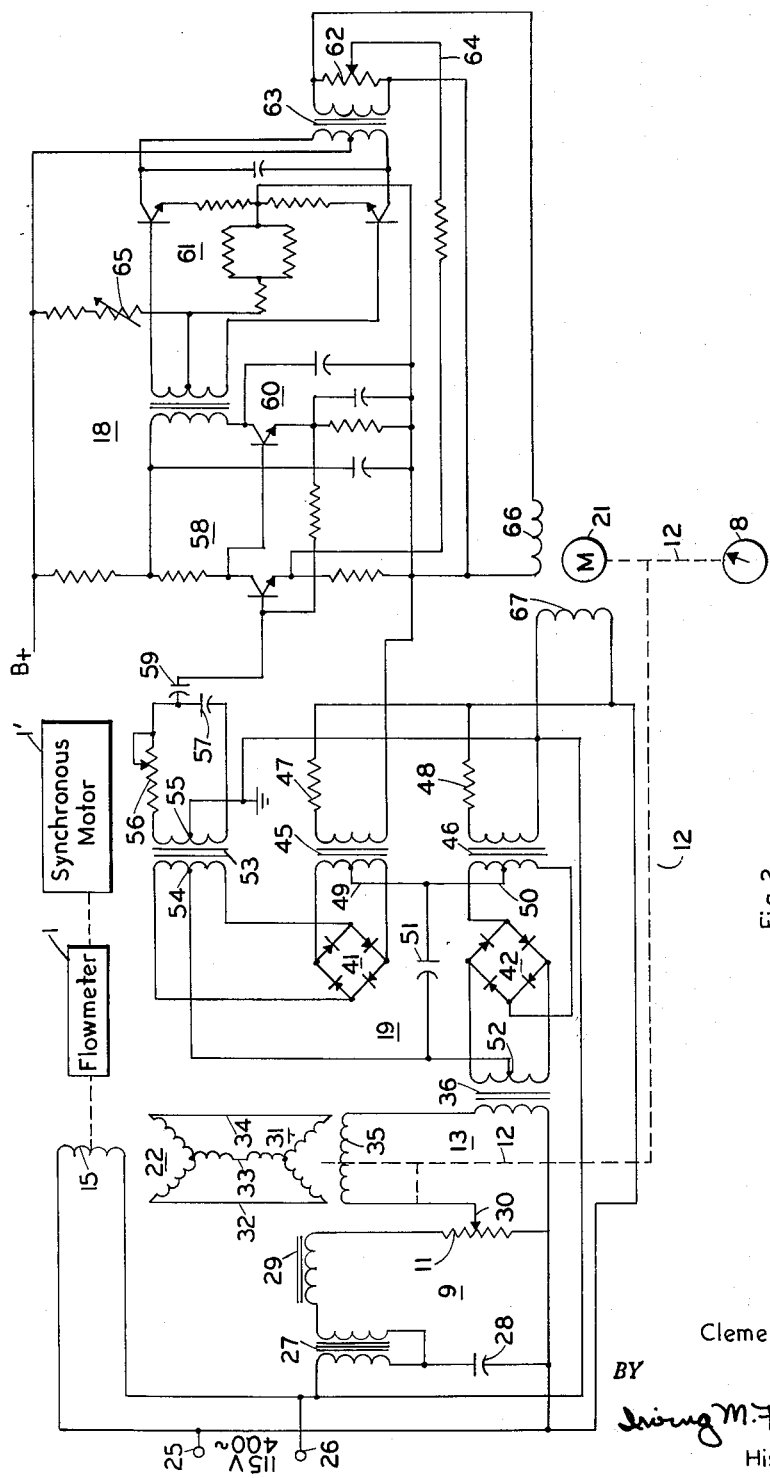

For a better understanding of this invention, reference may be had to the following description taken in connection with the accompanying drawings, in which:

FIG. 1 is a schematic representation shown in block diagram form of a mass flowmeter system incorporating the subject invention; and FIG. 2 is a schematic diagram of a portion of the arrangement shown in FIG. 1.

Referring to FIG. 1, the fluid to be measured passes through flowmeter or flow detector 1 via fluid conduit 2. In the flow detector 1 angular momentum proportional to line frequency is imparted to each unit mass of fluid, which can be a fuel, by an impeller (not shown) driven by the impeller drive synchronous motor 1'. By suitable means well known in the art, such as by recovering the angular momentum, a mechanical torque is developed proportional to the product of mass flow rate and line frequency.

The flow meter 1 may be of the type, but is not restricted to, that shown in Patent No. 2,714,310, granted August 2, 1955, to F. B. Jennings and assigned to the same assignee as the present invention. In such arrangements, the flow sensing means includes two similar rotors commonly referred to as the "impeller" and "turbine," respectively. Each rotor comprises a pair of concentric cylinders with radial vanes dividing the annular space between them into a number of identical flow passages. The rotors are enclosed in a common cylindrical housing with radial clearances being small enough to prevent appreciable fluid flow around the rotors. The impeller is driven by a "constant" speed electric motor, usually of the synchronous type, such that the impeller speed is proportional to line frequency. The angular momentum imparted to the fuel in transit through the impeller is recovered by the stationary turbine to produce a mechanical torque which in accordance with Newton's law is proportional to the product of mass flow rate and line frequency.

The turbine is restrained by a spring and deflects through an angle proportional to the torque produced. Such angular deflection is imparted to the rotor of synchro transmitter 3 by way of shaft 4 connecting between the turbine and the rotor of the transmitter synchro or selsyn 3. The rotor coil of the synchro transmitter 3 is energized from the power source which in the case of aircraft commonly has a nominal frequency of 400 cycles per second. The synchro transmitter 3 provides an electrical three-phase position signal 5 proportional to the product of mass flow rate times line frequency with the electrical phase of each of the three components of signal 5 being independent of line frequency. The flow detector 1 and synchro transmitter 3 may conveniently be packaged as a single unit located at the fuel flow line while the synchro receiver 6, along with its associated indicator and compensating network, may conveniently be contained within a second unit remotely located from the flow detector. The three-phase output signal 5 of the stator of synchro 3 is electrically connected via a connecting cable to the three-phase stator winding of the synchro receiver 6. The synchro receiver 6 produces a receiver output signal 7 across its rotor which is a single-phase voltage proportional to the product of the line voltage and the sine of the angular misalignment between the rotors of the synchro receiver and transmitter units. For small angular displacements of the type encountered the sine function is linear for all practical purposes.

Expressed mathematically the receiver synchro output voltages $e_R$ is;

$$e_R = -K_R V(\theta - \phi)$$

where:

$K_R$ = receiver synchro voltage gradient in volts/degree deflection/volt
$V$ = power source or line voltage
$\theta$ = Synchro receiver deflection in degrees
$\phi$ = synchro transmitter deflection in degrees The negative sign indicates the desired phase relation for proper combination of signals fed into the amplifier which will be described below. For a more complete description of the general theory of synchro transmitter and receiver construction and operation reference may be had to section 59(a) of the publication "Radar System Fundamentals" (NAVSHIPS 900, 017) published by the Bureau of Ships, Navy Dept., in April 1944.

The rotor deflection of the synchro receiver 6 is coupled through gearing 12 to the pointer of the calibrated indicator dial 8 to indicate the mass flow rate. Such a calibration, if made at a power supply frequency such as 400 cycles, is accurate only as long as the power source frequency remains constant. Variations of power source frequency result in variations of speed of the impeller of flow meter 1 and variations of impeller speed introduce errors into the indication given by indicator 8 as set forth in more detail in the copending patent application of Robert G. Ballard, Serial Number 590,850, filed June 12, 1956, now U.S. Patent 2,914,944, and assigned to the same assignee as the subject application.

The above relationship is expressed in terms of line frequency deviations since the line frequency of the disclosed system determines the speed of the synchronous motor driving the impeller of the flow meter 1. However, it should be appreciated that the subject invention can be utilized with any type of impeller drive by deriving an electrical signal from the impeller drive system which is proportional to the speed of the impeller. This may be conveniently accomplished through use of a tachometer generator coupled to the impeller drive. Therefore, for purposes of the subject discussion, frequency deviations may be equated to impeller speed deviations.

In order to compensate for variations of power source frequency a compensating electrical signal is developed and utilized as follows. The frequency sensing network 9 produces a voltage proportional to the product of line voltage or power source voltage times the deviation of the line frequency from the nominal frequency of 400 c.p.s. The output 10 of frequency sensing network is applied to a linear voltage transducer 11 to provide a voltage $e_f$ proportional to the product of line voltage, angular deflection of the synchro receiver and line frequency deviation. Expressed mathematically;

$$e_f = K_f \theta V(f - f_0)$$

where:

$K_f$ = characteristic constant of the frequency sensing network in volt seconds/degree/volt
$f$ = actual line frequency in c.p.s.
$f_0$ = nominal line frequency (400 c.p.s.)

The signal $e_f$ is applied to the adding network 13 via conductors 14 where it is combined with the synchro receiver signal 7 or $e_R$. The output 17 of the adding network 13 is fed to amplifier 18 via phase shift compensator 19. The phase shift compensator 19 makes the amplifier input signal insensitive to phase shifts which might occur in the frequency sensing network 9. The output 20 of the amplifier 18 is of sufficient power to drive servo motor 21 and the rotor of synchro receiver 6 to a position at which the signal 17 is zero to balance the servo system. This condition may be expressed by the following equation;

$$e_{\text{input}}(17) = e_f - e_R = 0$$

or $$e_{\text{input}}(17) = K_f \theta V(f - f_0) + K_R V(\theta - \phi) = 0$$

or $$\theta = \frac{K_R \phi}{K_f f + K_R - K_f f_0}$$

By suitable calibration techniques, such as by resistance adjustment in the frequency sensing network 9, the following relationship may be established;

$$K_f = \frac{K_R}{f_0}$$

and the equation for $\theta$ (above) becomes;

$$\theta = \frac{K_R \phi}{K_f f}$$

Therefore, the rotation of the synchro receiver rotor $\theta$, becomes proportional to mass flow rate and independent of frequency; since $\phi$, the angular deflection of the rotor of transmitter synchro 3, is proportional to mass rate of flow and frequency.

The rotation of the receiver rotor $\theta$ is coupled to the pointer of indicator 8 through gearing 12 to provide a true indication of mass rate of flow. Variations of line frequency are compensated for by the insertion of signal $e_f$ into the servo system driving the receiver rotor.

During operation, if the line frequency has no deviation from the nominal of 400 c.p.s., $e_f$ is zero and the system operates as a position telemetering arrangement with the synchro receiver 6 developing a signal $e_R$ proportional to the angular displacement between the transmitter synchro 3 and the receiver synchro 6. The servo system including the amplifier 18 and servo motor 21 drives the rotor of the receiver synchro 6 to a balance position determined by $e_R$.

If the line frequency should now deviate from the normal frequency the signal $e_f$ developed by the frequency sensing network 9 and linear voltage transducer 11 unbalances the servo loop. The unbalance voltage appearing at the amplifier 18 from the adding network 13 causes the servo motor 21 and gear train 12 to drive the receiver synchro 6 to a new balance position at which the output signal $e_R$ of the synchro receiver 6 is equal and opposite to the output signal $e_f$ of the frequency compensating network. However, the signal $e_R$ is proportional to the angular misalignment of the synchro transmitter 3 and the synchro receiver 6. With a frequency deviation signal $e_f$, the angular misalignment of the synchro transmitter 3 and synchro receiver 6 is also made proportional to $e_f$, and therefore, to the product of synchro receiver angle $\theta$ times deviation of the line frequency from the nominal frequency. The position of the synchro transmitter 3 at any given frequency and flow rate therefore differs from the position at a nominal frequency in proportion to the product of the flow rate times the deviation of line frequency from nominal frequency. Since this is precisely the opposite of the angular misalignment of the synchro receiver 6 relative to the synchro transmitter 3 as caused by the frequency compensating signal $e_f$, the steady state position of the synchro receiver 6 at any flow rate and frequency is the same as that taken by the transmitter at the same flow rate but at nominal line frequtncy. Therefore, the indicator which is calibrated at the nominal frequency reads true mass rate of flow independently of line frequency because of the compensation provided by $e_f$.

Circuitry suitable for use in the arrangement of FIG. 1 is shown in FIG. 2. Referring to FIG. 2, the line voltage of 115 volts, 400 c.p.s., is applied to the rotor 15 of synchro transmitter 3 through terminals 25 and 26. The flowmeter 1 drives the rotor 15 an angular amount proportional to the product of the mass rate of flow and line frequency to produce an electrical signal on the three-phase stator winding 22 proportional to the same product. The signal appearing across the stator winding 22 is fed through conductors 32, 33 and 34 to the three-phase stator winding 31 of the remotely located synchro receiver 6 to produce the signal $e_R$ on the rotor 35 of synchro 6.

The frequency sensing network 9 includes a transformer 27, with line voltage being applied across the primary in series with capacitor 28. The secondary of transformer 27 in series with inductance 29 and potentiometer or linear voltage transducer 11 are connected across capacitor 28. Assuming, as is substantially the case under all operating conditions, that the secondary of transformer 27 draws no appreciable current, the reactance of the capacitor 28 is inversely proportional to the line frequency and the reactance of the transformer primary is directly proportional to line frequency. As the line frequency varies, the voltage across the transformer secondary and capacitor 28 vary in opposite directions. The transformer is connected so that these voltages are in reverse polarity and the output voltage appearing across the potentiometer 11 is proportional to their difference. The electrical characteristics of the transformer 27 and capacitor 28 are adjusted to produce equal voltages and thus zero output at the nominal line frequency. This adjustment may conveniently be accomplished through a selective adjustment of taps on the secondary of transformer 27.

Thus with nominal line frequency there is no output 10 from the frequency sensing network 9 and the synchro receiver 6 accurately follows the positioning of the synchro transmitter 3 through action of the amplifier 18 and servo motor 21. At frequencies other than nominal line frequency the difference between the voltages of the secondary of transformer 27 and capacitor 28 is proportional to the deviation of the frequency from the nominal. Thus, the output voltage $e_f$ which is proportional to the voltage appearing across potentiometer 11 is proportional to the deviation of line frequency from nominal and the phase of which is dependent upon whether the line frequency is above or below the nominal frequency.

The phase of the voltage produced across potentiometer 11 and that of the synchro receiver 6 must be substantially the same or opposite under all operating conditions so that the signals may be properly combined at adding network 13. Proper phase relationship is accomplished through use of the phase-shifting reactor 29 in series with the output potentiometer. This reactor serves the additional purpose of increasing the efficiency of the network 9 by producing a substantially pure resistive network output impedance.

The portion of the voltage appearing across potentiometer 11 which is utilized at adding network 13, that is the portion between shaft or arm 30 and terminal 25, is modulated in proportion to the mass flow rate by connecting the shaft 30 to the rotor of synchro receiver 6 through gearing 12. The single phase output signal $e_f$ is thereby made proportional to the product of frequency deviation and the rotation of the rotor 35 of synchro 6. The modulation of the compensating signal in accordance with the positioning of the rotor 35 of receiver synchro 6 is required for flowmeter systems of the type described which are capable of measuring a comparatively wide range of flow. It would not be required if the flow rate of a particular system varied only within a comparatively narrow range. The modulation is required because the magnitude of the compensating signal required for a given frequency deviation is proportional to the mass flow rate. For example, at zero flow rate it matters not what the impeller speed or speed deviation may be, because the flowmeter turbine will not deflect at all, and no frequency compensation signal is required. As the mass flow rate increases from zero flow to a low value at which only a small turbine angular deflection could result then the signal $e_R$ which is to be compensated is of a small magnitude and the compensating signal $e_f$ to be compared with $e_R$ must likewise be of a relatively small magnitude. However, at large flow rates, the signal $e_R$ is relatively large and compensation for example, of a 5% frequency deviation, requires a larger $e_f$ signal than is required for a 5% frequency deviation at a lower flow rate.

The signal $e_R$ developed across the rotor 35 of synchro receiver 6 is connected in series with the signal $e_f$ in adding network 13 and the resultant signal is coupled through transformer 36 to the phase shift compensator 19.

The phase shift compensator 19 is a rectifier ring demodulator-modulator network and includes rectifier bridges 41 and 42 each utilizing four semi-conductor type 1N459 rectifiers. A reference line voltage is applied across opposite corners of each. The reference voltage for rectifier bridge 41 is passed through coupling transformer 45 while the reference voltage for rectifier bridge 42 is passed through coupling transformer 46. Limiting resistors 47 and 48 are connected in series with the primary or line side of transformers 45 and 46, respectively. The secondary or rectifier bridge side of transformers 45 and 46 have center taps 49 and 50 connected together and are connected through filter capacitor 51 to the center tap 52 of the secondary of transformer 36. The rectifier bridges 41 and 42 have unlike elements of the rectifiers connected together as shown in FIG. 2. The ends of the secondary of input transformer 36 are connected across the remaining junctions of rectifier bridge 42 and the remaining junctions of the rectifier bridge 41 are connected to the primary side of output coupling transformer 53. The center tap 54 of the primary side of output transformer 53 is connected to the center tap 52 of the input transformer 36.

The main function of the compensator 19 is to reject quadrature components in the signal voltage 17 produced by the adding network 13. Phase shift in the frequency sensing network introduces quadrature components in the signal that would tend to saturate the amplifier and cause stability problems and indication errors. In addition, the compensator also protects the amplifier from overvoltage due to rectifier and transformer saturation characteristics.

During operation, the input signal appearing across the rectifier bridge 42 through transformer 36 is demodulated to produce a D.C. signal which, because of the line frequency reference signal applied to the bridge 42 through transformer 46, is proportional to the in-phase component of the input signal. The D.C. signal is filtered by capacitor 51 and then modulated by the reference line frequency signal applied to rectifier bridge 41 through transformer 45 to produce an in-phase (relative to the line voltage) A.C. output signal which is proportional to the D.C. signal. The phase compensated A.C. output signal is then applied to the amplifier 18 through output transformer 53 with suitable phase relationship for proper amplifier operation.

The center tap 55 of the secondary of the output coupling transformer 53 is grounded and the ends of the secondary are connected to a phase shifter consisting of potentiometer 56 and capacitor 57 in series which compensate for phase shift in the amplifier 18. Amplifier 18 may be of any suitable type well known in the art and in the interest of brevity and clarity will not be described in detail. It is sufficient to say that the amplifier must produce an output having sufficient power to drive servo motor 21 to null the signals $e_R$ and $e_f$. The amplifier 18 shown in FIG. 2 is of the transistor type and includes a preamplifier stage 58 coupled via coupling capacitor 59 to the junction between the capacitor 57 and potentiometer 56, a driver stage 60, and a transformer coupled, push-pull, class B output stage 61. Stability of operation and a selective gain control is obtained through the negative feedback arrangement provided by potentiometer 62 across the secondary of the output coupling transformer 63. Tap 64 of potentiometer 62 enables the selection of a portion of the output voltage which is connected to the preamplifier stage 58 to provide the degree of negative feedback desired.

The output of amplifier 18 appearing at the secondary of transformer 63 is connected to one phase 66 of the two-phase servo motor 21 while the other phase 67 of the servomotor 21 is energized by the line voltage appearing at terminals 25 and 26. The servo motor 21 rotates an amount and in the direction determined by the control signal 17 so as to cause the synchro receiver rotor 35 and the indicator 8 through gearing 12 to assume a position at which $e_R$ is equal and opposite to $e_f$. This position differs from the synchro transmitter 15 position by the same angle as the transmitter rotor is shifted by the frequency deviation and compensates for such frequency deviations in a manner more fully described above.

Therefore, while particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects.

What I claim as new and desire to secure by Letters Patent of the United States is:

1. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for varitions of speed of said motive means over a comparatively wide range of flow comprising, a first multi-phase synchro adapted to develop a first signal through rotation thereof in accordance with the response of the flow sensing means, a second multi-phase synchro electrically connected to said first synchro to develop a single-phase second signal in accordance with the angular difference in position of the rotors of said synchros, the multiphase members of said first and second synchros being connected together, means to produce a third electrical signal proportional to deviations of the speed of the motive means from a predetermined speed, means to modulate said third signal in accordance with the mass rate of flow, a series adding circuit to combine said single-phase and modulated signals to provide a resultant signal, means to position said second synchro in accordance with said resultant signal, and an indicator responsive to the position of said second synchro.

2. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for variations of speed of said motive means particularly within a comparatively narrow range of flow and including, means to develop a first signal in accordance with the response of the flow sensing means, means to produce a second signal having a magnitude and phase representing the magnitude and direction, respectively, of deviations of the speed of the motive means of said flow detector from a predetermined speed, and means to combine said first and second signal to provide a resultant signal to position an indicator in response thereto, said means to provide said second signal connected to receive an electrical signal proportional to the speed of said motive means and including, a static transformer having a primary and secondary side with one end of each connected together, and a capacitor, said transformer and said capacitor being connected such that the voltage across the capacitor balances the voltage across one side of the transformer at said predetermined speed, said second signal being developed in the secondary circuit of said transformer.

3. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for variations of speed of said motive means particularly within a comparatively narrow range of flow and including, means to develop a first signal in accordance with the response of the flow sensing means, means to produce a second signal having a magnitude and phase representing the magnitude and direction, respectively, of deviations of the speed of the motive means from a predetermined speed, and means to combine said first and second signal to provide a resultant signal to position an indicator in response thereto, said means to produce said second signal having an input connected to receive an electrical signal proportional to the speed of said motive means and including, a static transformer having a primary and secondary side with one end of each connected together and to a capacitor, the other side of said capacitor and the other side of the primary of said transformer being connected to said input, said transformer and said capacitor being connected such that the voltage across the capacitor balances the voltage across the secondary side of the transformer at said predetermined speed, said second signal being developed in the secondary circuit of said transformer.

4. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for variations of speed of said motive means particularly within a comparatively narrow range of flow and including, means to develop a first signal in accordance with the response of the flow sensing means, means to produce a second signal having a magnitude and phase representing the magnitude and direction, respectively, of deviations of the speed of the motive means from a predetermined speed, and means to combine said first and second signal to provide a resultant signal to position an indicator in response thereto, said means to produce said second signal including, a static transformer having a primary and secondary side with one end of each connected together and to a capacitor, the other side of said capacitor and the other side of the primary of said transformer being connected to receive an electrical signal proportional to the speed of said motive means, said transformer and said capacitor being connected such that the voltage across the capacitor is equal and opposite to the voltage across the secondary side of the transformer at said predetermined speed, said second electrical signal being developed across the series circuit including said capacitor and said transformer secondary.

5. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for variations of speed of said motive means over a comparatively wide range of flow, and including, means to develop a first signal in accordance with the response of the flow sensing means, means to produce a second signal having a magnitude and phase representing the magnitude and direction, respectively, of deviations of the speed of the motive means from a predetermined speed, means to modulate said second electrical signal in accordance with the mass flow rate and means to combine said first signal and said modulated signal to provide a resultant signal to position an indicator in response thereto, said means to produce said second signal including, a static transformer having a primary and secondary side with one end of each connected together and to a capacitor, the other side of said capacitor and the other side of the primary of said transformer being connected to receive an electrical signal proportional to the speed of said motive means, said transformer and said capacitor being connected such that the voltage across the capacitor is equal and opposite to the voltage across the secondary side of the transformer at said predetermined speed, said second electrical signal being developed across the series circuit including said capacitor and said transformer secondary, said modulating means comprising a variable resistor the ends of which are connected across said series circuit, and means operable to position the tap of said variable resistor in accordance with mass flow rate to modulate the said second signal appearing between said arm and one end of the variable resistor.

6. For use in a fluid mass rate of flow measuring apparatus of the type having a mass flow detector to conduct the flowing fluid and including motive means, and sensing means responsive to the product of the mass rate of flow and speed of said motive means; an indicating arrangement adapted to compensate for variations of speed of said motive means particularly within a comparatively narrow range of flow and including, means to develop a first signal in accordance with the response of the flow sensing means, means to produce a second signal having a magnitude and phase representing the magnitude and direction, respectively, of deviations of the speed of the motive means from a predetermined speed, and means to combine said first and second signal to provide a resultant signal to position an indicator in response thereto, said means to produce said second signal including, a capacitor, an inductance and a static transformer having a primary and secondary side with one end of each connected together and to said capacitor, the other side of said capacitor and the other side of the primary of said transformer being connected to receive an electrical signal proportional to the speed of said motive means, said transformer and said capacitor being connected such that the voltage across the capacitor balances the voltage across the secondary side of the transformer at said predetermined speed, said second electrical signal being developed across the series circuit including said capacitor, said transformer secondary, and said inductance.

References Cited in the file of this patent

UNITED STATES PATENTS

| | | |
|---|---|---|
| 2,724,969 | Bloser | Nov. 29, 1955 |
| 2,914,944 | Ballard | Dec. 1, 1959 |
| 2,975,634 | Rose | Mar. 21, 1961 |

OTHER REFERENCES

Pages 273–275, Basic Electrical Engineering, by Fitzgerald, published in 1945 by McGraw-Hill Co. (Copy available in Div. 36 of U.S. Patent Office.)